United States Patent
Takehara et al.

(10) Patent No.: US 7,307,364 B2
(45) Date of Patent: Dec. 11, 2007

(54) MOTOR AND RECORDING MEDIUM DRIVE DEVICE

(75) Inventors: Isamu Takehara, Chiba (JP); Shinji Kinoshita, Chiba (JP)

(73) Assignee: Seiko Instruments Inc. (JP)

( * ) Notice: Subject to any disclaimer, the term of this patent is extended or adjusted under 35 U.S.C. 154(b) by 16 days.

(21) Appl. No.: 10/549,297

(22) PCT Filed: Mar. 19, 2003

(86) PCT No.: PCT/JP03/03320

§ 371 (c)(1),
(2), (4) Date: Sep. 15, 2005

(87) PCT Pub. No.: WO2004/084381

PCT Pub. Date: Sep. 30, 2004

(65) Prior Publication Data
US 2006/0220480 A1 Oct. 5, 2006

(51) Int. Cl.
H02K 5/16 (2006.01)
(52) U.S. Cl. ...................................................... 310/90
(58) Field of Classification Search ................. 310/90, 310/90.5, 156.01
See application file for complete search history.

(56) References Cited

U.S. PATENT DOCUMENTS 5,289,064 A * 2/1994 Sakamoto ................. 310/49 R
6,552,456 B2 * 4/2003 Goto et al. .................... 310/90
6,674,200 B2 * 1/2004 Tokunaga .................... 310/90

FOREIGN PATENT DOCUMENTS

| JP | 11-187611 | 7/1999 |
|---|---|---|
| JP | 11-187612 | 7/1999 |
| JP | 2001-33725 A | 2/2001 |
| JP | 2001-69704 A | 3/2001 |
| JP | 3184795 B2 | 6/2001 |
| JP | 3184794 B2 | 7/2001 |
| JP | 2003-49828 A | 2/2003 |

* cited by examiner

Primary Examiner—Dang Le
Assistant Examiner—Nguyen Hanh
(74) Attorney, Agent, or Firm—Adams & Wilks

(57) ABSTRACT

The invention provides a motor that is provided with a fluid dynamic bearing for rotatably supporting a shaft body, by the dynamic pressure of fluid filling a clearance between itself and a shaft body support part. The motor is provided with: a stator having cores and coils; a rotor having permanent magnets arranged in a ring shape on the radial inner side of the stator, facing the cores and coils; and a fluid dynamic bearing which rotatably supports the rotor with respect to the stator. The fluid dynamic bearing is provided with: a cylindrical shaft body whose cross section is approximately cruciform; a shaft body support part, in which a shaft body insertion hole is formed for accommodating the shaft body; and a fluid which is filled into a clearance formed between the shaft body and the shaft body insertion hole, and there is provided a dynamic pressure generation unit comprising the fluid, and dynamic pressure generating grooves formed in at least one of the outer face of the shaft body, and the inner face of the shaft body insertion hole facing this outer face.

9 Claims, 3 Drawing Sheets

MOTOR AND RECORDING MEDIUM DRIVE DEVICE

CROSS REFERENCE TO RELATED APPLICATION

The present application is a U.S. national stage of International Application No. PCT/JP03/03320, filed Mar. 19, 2003, and published in a Non-English language.

TECHNICAL FIELD

The present invention relates to a motor that is provided with a fluid dynamic bearing for rotatably supporting a shaft body, by the dynamic pressure of a fluid filling a clearance between itself and a shaft body support part, and relates to a recording medium drive device provided with this motor.

BACKGROUND ART

Heretofore, a motor for rotating a recording medium formed in a disc shape, at a predetermined rotational speed, is installed in a hard disc drive (referred to hereunder as HDD) mounted onto a terminal unit such as a fixed type personal computer, a notebook type portable personal computer, or the like (for example, refer to Japanese Patent No. 3184794).

As shown in FIG. 4, this motor is provided with a fluid dynamic bearing 71, which enables the recording medium to rotate freely. The fluid dynamic bearing 71 is provided with a cylindrical shaft body 73 whose cross section is approximately cruciform, a sleeve 75 having a shaft body insertion hole 75a whose cross section is approximately cruciform and which houses the shaft body 73 such that it can rotate freely, and liquid 77 such as oil, filling the clearance between the shaft body insertion hole 75a and the shaft body 73.

Furthermore, cores and coils are provided on the outer peripheral surface of the sleeve. A rotor formed substantially cylindrically and with a base is installed on the top end of the shaft body, and a ring shaped permanent magnet is fixed on the inner peripheral surface of the cylindrical wall part of the rotor, facing the cores and the coils. The cylindrical wall part of the rotor forms a return yoke for constraining the direction of the magnetic flux entering and leaving the inner peripheral surface of the permanent magnet located on the opposite side to the outer peripheral surface facing the cores and the coils.

However, in the conventional motor, since the cores 79 and the coils 81 are located on the inner peripheral surface 85b side of a permanent magnet 85, it is not possible to reduce the diameter of a rotor 83 to which the permanent magnet 85 is fixed. Therefore, there is a problem in that there is a limitation to miniaturization of the motor.

SUMMARY OF THE INVENTION

A motor of the present invention is provided with: a stator having cores and coils; and a rotor having a permanent magnet arranged in a ring shape on the radial inner side of the stator, facing the cores and coils, wherein the rotor is rotatably supported on the stator by means of a fluid dynamic bearing, and the fluid dynamic bearing is provided with: a shaft body fixed to the rotor; a shaft body support part, which has a closed end and is fixed to the stator, in which a shaft body insertion hole is formed for rotatably accommodating the shaft body; and a fluid which is filled into a clearance formed between the shaft body and the shaft body insertion hole, and the shaft body is provided with; a thrust shaft part formed in a flange shape in an axial central part, and a radial shaft part and a support part which are formed cylindrically on the opposite axial sides of the thrust shaft part, and the shaft body support part is provided with: a small diameter cylinder part which forms a closed end side of the shaft body insertion hole, and into which the radial shaft part is inserted such that it rotates freely; a large diameter cylinder part which forms an open end side of the shaft body insertion hole, and into which the thrust shaft part is inserted such that it rotates freely; and a counter plate which covers the open end of the shaft body insertion hole, and forms a capillary seal between itself and the support part, and there is provided a dynamic pressure generation unit comprising the fluid, and dynamic pressure generating grooves formed in at least one of the outer faces of the thrust shaft part and the radial shaft part, and the inner face of the shaft body insertion hole facing these outer faces.

In the motor according to the invention, by an alternating field generated in the cores and the coils acting upon the permanent magnet, the rotor and the shaft body rotate with respect to the stator and the shaft body support part. At this time, the dynamic pressure generating grooves collect the fluid such as air, water, oil, or the like, into the clearance between the outer faces of the radial shaft part and the thrust shaft part, and the inner face of the shaft body insertion hole, and generate pressure, so that the shaft body support part supports the shaft body by the pressure, such that it can rotate freely. Accordingly, the dynamic pressure (radial dynamic pressure) generated in the clearance between the outer face of the radial shaft part and the inner face of the shaft body insertion hole functions as a bearing in the radial direction, and the dynamic pressure (thrust dynamic pressure) generated in the clearance between the outer face of the thrust shaft part and the inner face of the shaft body insertion hole functions as a bearing in the axial direction.

Furthermore, since the permanent magnet is provided on the radial inner side of the cores and the coils, the cores and the coils are not provided on the radial inner side of the rotor to which the permanent magnet is fixed, as in the conventional configuration. Accordingly, it is possible to reduce the diameter of the rotor.

Moreover, in the motor, a ratio of the outer diameter of the thrust shaft part, to the outer diameter of the permanent magnet is approximately 1 to 2.

In the motor according to this invention, the reason that the ratio of the outer diameter of the thrust shaft part, and the outer diameter of the permanent magnet is approximately 1 to 2 is to prevent the rotor from vibrating in the axial direction, and also to reduce the current consumption required to rotate the rotor.

That is, if the outer diameter of the permanent magnet used for the motor is increased, and the volume of the permanent magnet is increased, the amount of magnetic flux entering and leaving the surface of the permanent magnet increases. As a result, the torque to rotate the rotor increases, and hence it is possible to reduce the current consumption required. However, in the case where the outer diameter of the permanent magnet is increased, the point of action of the torque moves outward in the radial direction. Therefore, the vibration of the rotor increases in proportion to the deviation in the perpendicularity of the rotor to the shaft body. Furthermore, conversely, in the case where the outer diameter of the permanent magnet is reduced, the torque to rotate the rotor decreases, and the current consumption required increases. However, it is possible to reduce the vibration of the rotor.

On the other hand, in the case where the outer diameter of the thrust shaft part is increased, the thrust dynamic pressure increases, and the rigidity of the shaft body increases. Therefore, the vibration of the rotor can be controlled. However the resistance (thrust bearing loss) against rotation increases in proportion to the magnitude of the thrust dynamic pressure, and hence the current consumption required to rotate the motor increases. Furthermore, conversely, in the case where the outer diameter of the thrust shaft part is reduced, the rigidity of the shaft body decreases, and the vibration of the rotor increases. However, it is possible to reduce the current consumption required to rotate the motor.

Moreover, the permanent magnet is only fixed on an axial direction surface of the rotor, and an inner peripheral surface of the permanent magnet located on an opposite side to an outer peripheral surface facing the cores and the coils is open.

In a motor according to the invention, since no return yoke for constraining the direction of the magnetic flux entering and leaving the inner peripheral surface of the permanent magnet is provided on the inner peripheral surface of the permanent magnet as in a conventional motor, redundant space is created on the inner peripheral surface side of the permanent magnet. In the case where the inner peripheral surface of the permanent magnet, and the outer face of the shaft body support part of the fluid dynamic bearing are positioned facing each other via the redundant space, it is possible to extend the thickness of the cylindrical wall part of the shaft body support part formed substantially cylindrically, outward in the radial direction, and close up the redundant space. As a result, it is possible to achieve an improvement in the strength of the shaft body support part formed substantially cylindrically, without increasing the diameter of the motor.

Furthermore, a recording medium drive device according to the present invention is provided with the aforementioned motor, and the aforementioned rotor is provided with a fixing part for attaching a sheet type recording medium.

In the recording medium drive device according to the invention, since the diameter of the rotor can be reduced, it is possible to achieve miniaturization of the recording medium drive device. Moreover, since the diameter of the rotor can be reduced, in the case for example where the recording medium is a so-called disc type recording medium of a disc shape having a central hole in the center for fixing it to the fixing part of a rotor, it is possible to reduce the diameter of the central hole. Accordingly, it is possible to increase the surface area of the recording medium, being the part in which a range of information is stored, and increase the recording capacity of the recording medium, without increasing the outer diameter of the recording medium.

BRIEF DESCRIPTION OF THE INVENTION

DETAILED DESCRIPTION OF THE INVENTION

Figure 1:
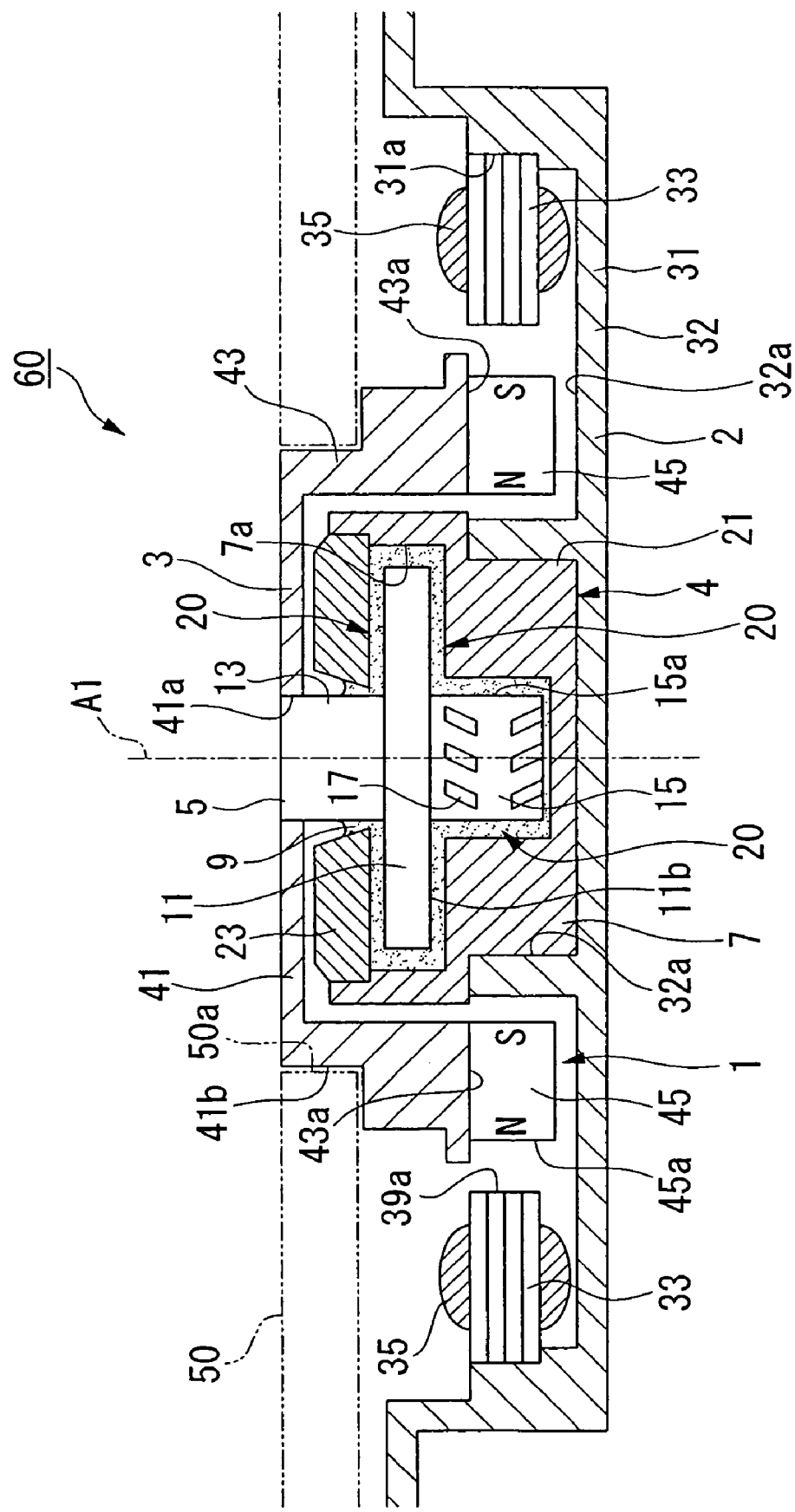
FIG. 1 is a cross sectional diagram showing a motor according to an embodiment of the invention.
Figure 2:
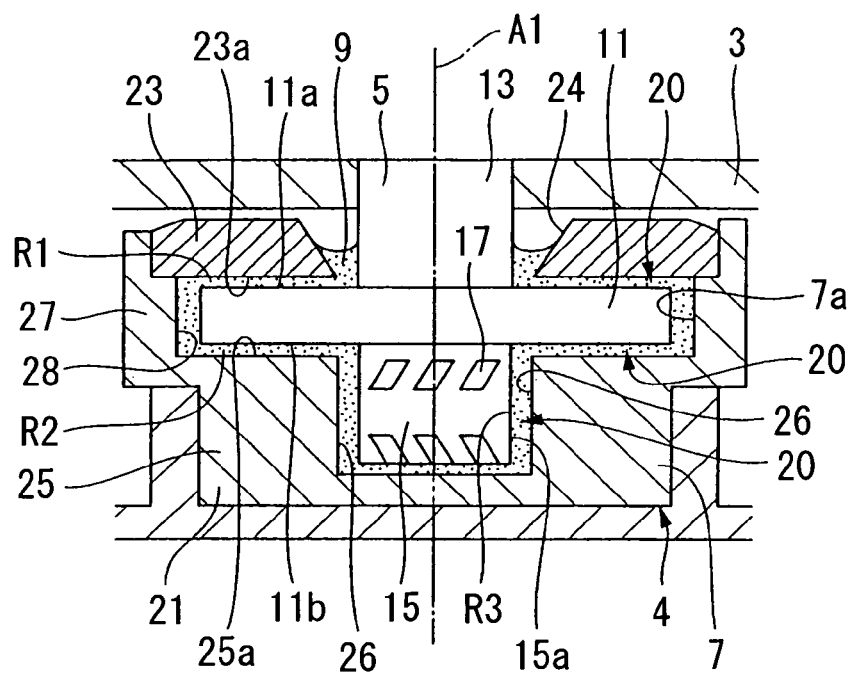
FIG. 2 is an enlarged cross sectional diagram showing a fluid dynamic bearing, in the motor of FIG. 1.
Figure 3:
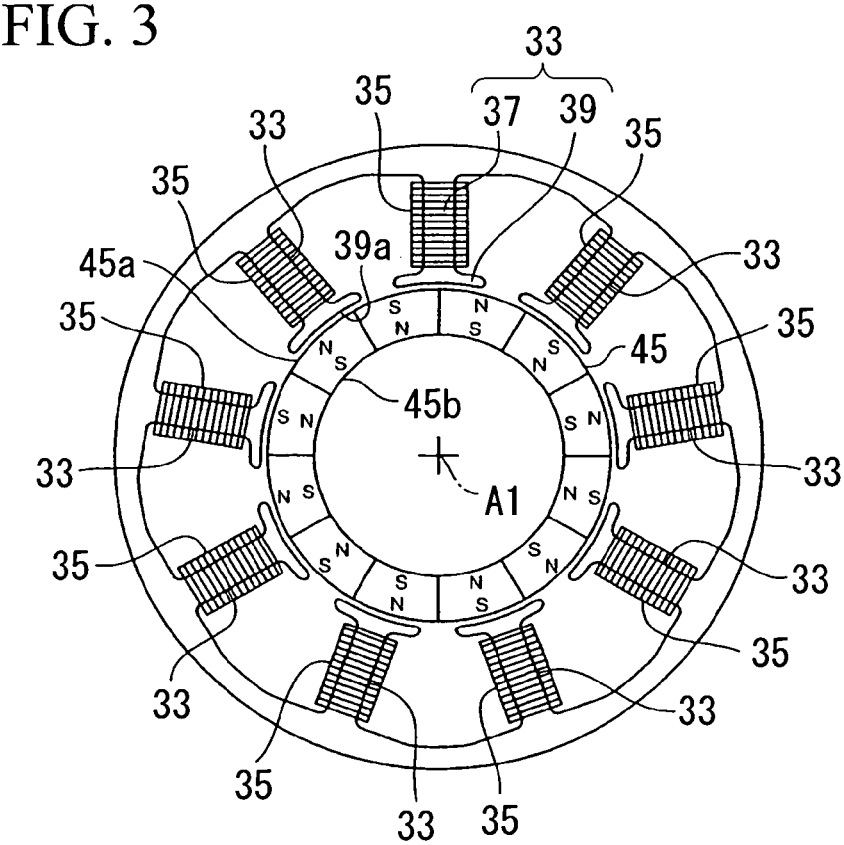
FIG. 3 is a schematic plan view showing the locations of cores, coils, and a permanent magnet, in the motor of FIG. 1.
Figure 4:
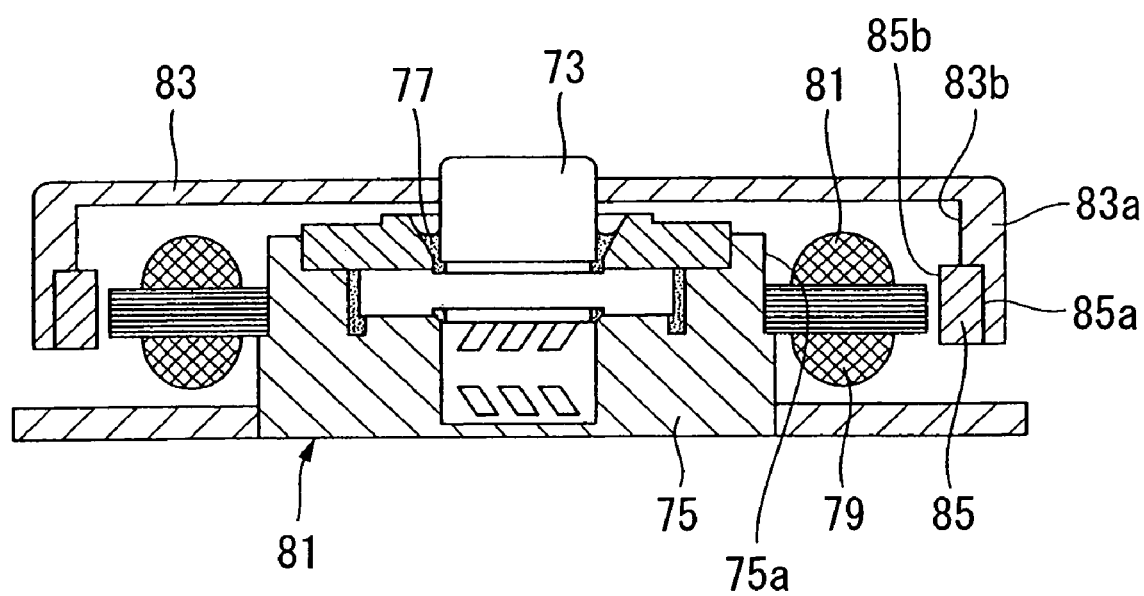
FIG. 4 is a cross sectional diagram showing an example of a conventional motor.

FIG. 1 to FIG. 3 are diagrams showing an embodiment according to the present invention. A motor according to this embodiment is applicable to a recording medium drive device for rotating a disc-shaped recording medium such as a magnetic recording medium, formed into a thin disc shape. As shown in FIG. 1, the motor 1 is provided with a stator 2, a rotor 3 that rotates around a central axis A1 with respect to the stator 2, and a fluid dynamic bearing 4 that supports the rotor 3 such that it rotates freely with respect to the stator 2.

The fluid dynamic bearing 4 is provided with a shaft body 5 formed in a cylindrical shape, whose cross section is approximately cruciform, a sleeve (shaft body support part) 7 having a shaft body insertion hole 7a, whose cross section is approximately cruciform for rotatably accommodating the shaft body 5, and lubricating oil (fluid) 9 filling in the clearance between the shaft body insertion hole 7a and the shaft body 5.

The shaft body 5, as shown in FIG. 2, is provided with a thrust shaft part 11 formed in a flange shape in the central axis A1 direction central part, i.e., the flange extends radially outwardly from the central axis A1, and a substantially cylindrical support part 13 and a radial shaft part 15, which protrude on the central axis A1 direction opposite sides. The thrust shaft part 11, the support part 13, and the radial shaft part 15 are integrated.

A plurality of dynamic pressure generating grooves 17 in a shape called a herring bone pattern is formed on the outer peripheral surface (outer surface) 15a of the radial shaft part 15. Furthermore, a plurality of dynamic pressure generating grooves (not shown in the figure) with a spiral shape is formed on the front face (outer surface) 11a and the rear surface (outer surface) 11b of the thrust shaft part 11.

The dynamic pressure generating grooves collect lubricating oil 9 and generate pressure when the shaft body 5 is rotated around the central axis A1, and support the shaft body 5 by the sleeve 7 such that it can rotate freely. That is, the dynamic pressure (radial dynamic pressure) of the lubricating oil 9 generated in the dynamic pressure generating grooves 17 in the radial shaft part 15 functions as a bearing in the radial direction of the shaft body 5, and the dynamic pressure (thrust dynamic pressure) of the lubricating oil 9 generated in the dynamic pressure generating grooves in the thrust shaft part 11 functions as a bearing in the central axis A1 direction of the shaft body 5. The lubricating oil 9 and the dynamic pressure generating grooves constitute the dynamic pressure generation unit 20.

The sleeve 7 comprises a sleeve body 21 of a substantially cylindrical shape with a base, and a counter plate for covering an open end of the sleeve body 21 in a state in which the support part 13 of the shaft body 5 protrudes with clearance between it and the shaft body 5. The sleeve body 21 is formed from austenitic stainless steel, which is a non-magnetic material, and comprises a small diameter cylinder part 25 and a large diameter cylinder part 27.

The small diameter cylinder part 25 has a hole 26 that forms a closed end of the shaft body insertion hole 7a, and the radial shaft part 15 is inserted in this hole 26. When the shaft body 5 rotates, the lubricating oil 9 is collected in a clearance R3 between an inner peripheral surface (inner surface) 26a of the hole 26, and an outer peripheral surface 15a of the radial shaft part 15, and radial dynamic pressure is generated.

The large diameter cylinder section 27 has an open hole 28 that forms the open end of the shaft body insertion hole 7a, and the thrust shaft part 11 is inserted in this open hole 28.

The small diameter cylinder part 25 and the large diameter cylinder part 27 are integrated.

The counter plate 23 is formed in a substantially disc shape, and has an open hole 24 formed in it for inserting the support part 13 in the central axis A1 direction. The open hole 24 constitutes the shaft body insertion hole 7a together with the hole 26 of the small diameter cylinder part 25, and the open hole 28 of the large diameter cylinder part 27. Furthermore, a capillary seal is applied between the counter plate 23 and the support part 13, and the lubricating oil 9 is prevented from leaking from the clearance between the shaft body 5 and the shaft body insertion hole 7a by the capillary seal.

When the shaft body 5 rotates, the lubricating oil 9 is collected into a clearance R1 between the front face 11a of the thrust shaft part 11 and the rear face (inner face) 23a of the counter plate 23 facing the front face 11a, and a clearance R2 between the rear face 11b of the thrust shaft part 11 and the axial end face (inner face) 25a of the small diameter cylinder part 25 facing the rear face 11b, and thrust dynamic pressure is generated.

The stator 2, as shown in FIG. 1, is provided with a base member 31 formed substantially cylindrically and with a shallow base, a plurality of cores 33 fixed on the inner peripheral surface 31a of the base member 31, and coils 35 wrapped around each of the cores 33. The base member 31 is formed from aluminum, being a non-magnetic material. Moreover, a hole 32a with the central axis A1 as its center is formed in the center of a bottom wall part 32 of the base member 31, and the sleeve body 21 of the bearing part 4 is fixed in the hole 32a.

Each of the cores 33 protrudes inward in the radial direction from the inner peripheral surface 31a of the base member 31, and as shown in FIG. 3, are each provided with an armature 37 on which to wind the coil 35, and a magnetic pole piece 39 formed at the tip located on the radial inner side of the armature 37. The magnetic pole piece 39 is formed wider than the armature 37 in the circumferential direction, and functions to make the magnetic flux distribution in the clearance between it and a permanent magnet 45, which is described later, close to a required form. The coils 35 are electrically connected to electric power, which is not shown in the drawing, and an alternating field can be formed by the cores 33 and the coils 35.

As shown in FIG. 1, the rotor 3 is formed substantially cylindrically and with a base, and is formed from magnetic stainless steel. An open hole 41a with the central axis A1 as its center is formed in the center of the bottom wall part 41 of the rotor 3, and is fixed to the support part 13 of the bearing part 4. A ring shaped front face 43a facing the central axis A1 direction is formed at the tip end of a cylindrical wall part 43 protruding from the periphery of the bottom wall part 41 of the rotor 3. The rotor 3 is arranged such that its front face 43a faces the inner surface 32a of the bottom wall part 32 of the base member 31. Furthermore, a permanent magnet 45 formed in a ring is fixed on the front face 43a of the cylindrical wall part 43 with an adhesive or the like.

The permanent magnet 45, as shown in FIGS. 1 and 3, is a so-called radial non-isotropic or isotropic neodymium magnet in which a plurality of magnetic poles is arranged in a ring, and the magnetic flux direction of each of the magnetic poles substantially coincides with the radial direction of the permanent magnet 45. The permanent magnet 45 is fixed only on the front surface 43a of the cylindrical wall part 43, and its inner peripheral surface 45b is open. That is, on the inner peripheral surface 45b of the permanent magnet 45 located on the opposite side to the outer peripheral surface 45a facing the cores 33 and the coils 35, no return yoke for constraining the direction of the magnetic flux entering and leaving the inner peripheral surface 45b is provided, as it would be in a conventional motor.

Therefore, redundant space for the return yoke is created on the inner peripheral surface 45b side of the permanent magnet 45. However, it is possible to extend the thickness of the cylindrical wall part of the sleeve 7 facing the inner peripheral surface 45b of the permanent magnet 45 outward in the radial direction so as to close up the redundant space.

The ratio of the outer diameter of the permanent magnet 45 to the outer diameter of the thrust shaft part 11 of the fluid dynamic bearing 4 is approximately 2 to 1. Here, the reason that the ratio is approximately 2 to 1 is to prevent the rotor 3 from vibrating in the axial direction, and also to reduce the current consumption required to rotate the rotor 3.

That is, if the outer diameter of the permanent magnet 45 is increased, and the volume of the permanent magnet 45 is increased, the amount of magnetic flux entering and leaving the outer peripheral surface 45a of the permanent magnet 45 increases. As a result, the torque to rotate the rotor 3 increases, and hence it is possible to reduce the current consumption required. However, in the case where the outer diameter of the permanent magnet 45 is increased, the point of action of the torque moves outward in the radial direction. Therefore, the vibration of the rotor 3 increases in proportion to the deviation in the perpendicularity of the rotor 3 to the shaft body 5. Furthermore, conversely, in the case where the outer diameter of the permanent magnet 45 is reduced, the torque to rotate the rotor 3 decreases, and the current consumption required increases. However, it is possible to reduce the vibration of the rotor 3.

On the other hand, in the case where the outer diameter of the thrust shaft part 11 is increased, the thrust dynamic pressure increases, and the rigidity of the shaft body 5 increases. Therefore, the vibration of the rotor 3 can be controlled. However the resistance (thrust bearing loss) against rotation increases in proportion to the magnitude of the thrust dynamic pressure, and hence the current consumption required to rotate the motor 1 increases. Furthermore, conversely, in the case where the outer diameter of the thrust shaft part 11 is reduced, the rigidity of the shaft body decreases, and the vibration of the rotor 3 increases. However, it is possible to reduce the current consumption required to rotate the motor 1.

A step part (fixing part) 41b for supporting a disc type recording medium (recording medium) 50 is formed in the periphery of the bottom wall part 41 of the rotor 3. By fitting a central hole 50a formed in the center of the disc type recording medium 50 to the step part 41b, the disc type recording medium 50 can rotate around the central axis A1 together with the rotor 3 and the shaft body 5.

By means of the motor 1 provided with the rotor 3 having the step part 41b, a recording medium drive device 60 is formed.

When rotating the disc type recording medium 50 by the recording medium drive device 60 constructed in this manner, an alternating field is generated in the cores 33 and the coils 35, and the rotor 3 is rotated by the alternating field acting on the permanent magnet 45. At this time, the shaft body 5 rotates around the central axis A1, and the sleeve 7 supports the shaft body 5 and the rotor 3, such that they can rotate, by the radial dynamic pressure and the thrust dynamic pressure generated in the dynamic pressure generation unit 20.

As described above, in the motor 1, since the permanent magnet 45 is located on the radial inner side of the cores 33 and the coils 35, the cores 33 and the coils 35 are not provided on the radial inner side of the rotor 3 as they would be in a conventional motor. Accordingly, it is possible to make the diameter of the rotor 3 smaller than in a conventional motor, thus enabling miniaturization of the motor 3.

Furthermore, by making the ratio of the outer diameter of the thrust shaft part 11 to the outer diameter of the permanent magnet 45 approximately 1 to 2, it is possible to prevent the rotor 3 from vibrating in the axial direction, and it is also possible to reduce the current consumption required to rotate the rotor 3.

Moreover, by closing up the redundant space for a return yoke by the cylindrical wall part of the sleeve 7, it is possible to achieve an improvement in the strength of the sleeve 7, without increasing the diameter of the motor 1, and hence it is possible to improve the reliability of the motor 1.

Furthermore, in the case where the motor 1 is applied to a recording medium drive device 60 to rotate a disc type recording medium 50, since the outer diameter of the rotor 3 can be reduced, it is possible to miniaturize the recording medium drive device 60.

Moreover, since the diameter of the rotor 3 can be reduced, it is possible to make the central hole 50a of the disc type recording medium 50 small. Accordingly, without increasing the outer diameter of the disc type recording medium 50, it is possible to increase the area of the front face of the disc type recording medium 50, which is the region for recording, thus enabling its recording capacity to be increased.

Furthermore, since it is possible to prevent the rotor from vibrating, when the disc type recording medium 50 is rotated, the disc type recording medium 50 rotates stably. Therefore, it is possible to avoid poor conditions when writing to the disc type recording medium 50, or when reading from the disc type recording medium 50.

Moreover, the dynamic pressure generating grooves constituting the dynamic pressure generation unit 20 in the axial direction are formed on the front face 11a and the rear face 11b of the thrust shaft part 11. However, this is not limiting, and they may be formed on the rear face 23a of the counter plate 23 and the axial end face 25a of the small diameter cylinder part 25, facing the front face 11a and the rear face 11b of the thrust shaft part 11 respectively.

Furthermore, the dynamic pressure generating grooves 17 constituting part of the dynamic pressure generation unit 20 in the radial direction are formed on the outer peripheral surface 15a of the radial shaft part 15. However, this is not limiting, and they may be formed on the inner peripheral surface 26a of the small diameter cylinder part 25 facing the outer peripheral surface 15a of the radial shaft part 15.

Moreover, lubricating oil 9 constituting the dynamic pressure generation unit 20 fills the clearance between the shaft body insertion hole 7a and the shaft body 5. However, this is not limiting, and the clearance may be filled with at least any fluid such as air, gas, or water.

The embodiment of the present invention is described in detail with reference to the drawings as above. However, specific constructions are not limited to this embodiment, and any design changes and the like that do not depart from the gist of the present invention are included.

INDUSTRIAL APPLICABILITY

As described above, using the present invention, it is possible to reduce the diameter of the rotor by locating the permanent magnet on the radial inner side of the cores and coils. Therefore it is possible to achieve miniaturization of the motor.

Furthermore, by making the ratio of the outer diameter of the thrust shaft part to the outer diameter of the permanent magnet approximately 1 to 2, it is possible to prevent the rotor from vibrating in the axial direction, and also it is possible to reduce the current consumption required to rotate the rotor.

Moreover, in the case where redundant space for the return yoke is closed up by the cylindrical wall part of the shaft body support part, it is possible to achieve an improvement in the strength of the shaft body support part, and hence it is possible to improve the reliability of the motor.

Furthermore, in the case where this motor is installed in a recording medium drive device, it is possible to miniaturize the recording medium drive device. Moreover, in the case where the recording medium is a so-called disc type recording medium, it is possible to increase the surface area of the recording medium, thus enabling the recording capacity to be increased, without increasing the outer diameter.

What is claimed is:

1. A motor comprising:
   a stator having cores and coils;
   a rotor having a permanent magnet arranged in a ring shape on the radial inner side of said stator, facing said cores and coils; and
   a fluid dynamic bearing which rotatably supports said rotor with respect to said stator, said fluid dynamic bearing having a shaft body fixed to said rotor,
   a shaft body support part, which has a closed end and is fixed to said stator, and in which a shaft body insertion hole is formed for rotatably accommodating said shaft body, and
   a fluid which is filled into a clearance formed between said shaft body and said shaft body insertion hole,
   wherein said shaft body has a thrust shaft part formed in a flange shape in an axial central part, and
   a radial shaft part and a support part which are formed cylindrically on the opposite axial sides of said thrust shaft part,
   wherein said shaft body support part has a small diameter cylinder part which forms a closed end side of said shaft body insertion hole, and into which said radial shaft part is inserted such that it rotates freely,
   a large diameter cylinder part which forms an open end side of said shaft body insertion hole, and into which said thrust shaft part is inserted such that it rotates freely, and
   a counter plate which covers the open end of said 10 shaft body insertion hole, and forms a capillary seal between itself and said support part, and
   a dynamic pressure generation unit comprising said fluid, and dynamic pressure generating grooves formed in at least one of the outer faces of said thrust shaft part and the outer faces of said radial shaft part, and the inner face of said shaft body insertion hole facing these outer faces,
   wherein a ratio of the outer diameter of said thrust shaft part to the outer diameter of said permanent magnet is approximately 1 to 2.

2. A motor according to claim 1, wherein said permanent magnet is only fixed on an axial direction surface of said rotor, and an inner peripheral surface of said permanent magnet located on an opposite side to an outer peripheral surface facing said cores and said coils is open.

3. A recording medium drive device provided with the motor according to claim 1, and said rotor is provided with a fixing part for attaching a sheet type recording medium.

4. A motor comprising: a stator having a plurality of cores arranged in a ring, each core extending radially inwardly from a proximal end thereof and terminating at a distal end thereof in a magnetic pole piece, and a coil wound on each core; a rotor having a ring-shaped permanent magnet disposed radially inwardly of the ring of cores such that the radial outer side of the permanent magnet is spaced from and faces the magnetic pole pieces; and a fluid dynamic bearing that rotatably supports the rotor with respect to the stator, the fluid dynamic bearing having a shaft body connected to the rotor for rotation therewith, the shaft body having a radially outwardly extending flange, a shaft body support connected to the stator and having an opening in which is rotatably disposed the flanged shaft body, and dynamic pressure generating grooves formed in opposed surfaces of the flanged shaft body and the shaft body support, wherein a ratio of the outer diameter of the flange to the outer diameter of the permanent magnet is approximately 1 to 2.

5. A motor according to claim 4; further including a fluid contained in the opening in a clearance space between the shaft body and the shaft body support.

6. A motor according to claim 5; wherein the fluid is lubricating oil.

7. A motor according to claim 4; wherein the stator has a base portion having a hole in which is fitted a bottom portion of the shaft body support, and wherein the radial inner side of the permanent magnet is spaced from and faces the outer surface of the stator base portion in the region of the hole.

8. A motor according to claim 7; wherein the space between the facing permanent magnet and the stator base portion is open and free of any structure.

9. A motor according to claim 4; wherein the rotor has a cylindrical wall part that surrounds the fluid dynamic bearing, the permanent magnet being fixed to the lower end face of the cylindrical wall part.

* * * * *